(12) United States Patent
Dou et al.

(10) Patent No.: US 9,630,383 B2
(45) Date of Patent: Apr. 25, 2017

(54) BIAXIALLY ORIENTED POLYPROPYLENE FILM WITH LOW MOISTURE VAPOR TRANSMISSION RATE

(71) Applicant: TORAY PLASTICS (AMERICA), INC., North Kingstown, RI (US)

(72) Inventors: Shichen Dou, Sugarland, TX (US); Keunsuk P. Chang, North Kingstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 0 days.

(21) Appl. No.: 14/282,450

(22) Filed: May 20, 2014

(65) Prior Publication Data

US 2015/0336359 A1    Nov. 26, 2015

(51) Int. Cl.
*B32B 27/08*    (2006.01)
*B32B 27/32*    (2006.01)

(52) U.S. Cl.
CPC .............. *B32B 27/32* (2013.01); *B32B 27/08* (2013.01); *B32B 2250/03* (2013.01); *B32B 2250/242* (2013.01); *B32B 2255/10* (2013.01); *B32B 2255/205* (2013.01); *B32B 2264/102* (2013.01); *B32B 2270/00* (2013.01); *B32B 2307/31* (2013.01); *B32B 2307/406* (2013.01); *B32B 2307/412* (2013.01); *B32B 2307/518* (2013.01); *B32B 2307/704* (2013.01); *B32B 2307/7246* (2013.01); *B32B 2307/75* (2013.01); *B32B 2439/00* (2013.01); *B32B 2439/70* (2013.01); *Y10T 428/31913* (2015.04); *Y10T 428/31938* (2015.04)

(58) Field of Classification Search
USPC .................................................. 428/516, 523
IPC ............ B32B 27/08,27/32, 2250/03, 2250/242, 2264/102, 2307/412, 2307/406, 2553/00, 2307/704, 2307/7246; Y10T 428/31938, 428/31913
See application file for complete search history.

(56) References Cited

U.S. PATENT DOCUMENTS

2008/0004391 A1*  1/2008  Chan .................. C08F 2/44
                                                         524/445

* cited by examiner

*Primary Examiner* — Hrayr A Sayadian
(74) *Attorney, Agent, or Firm* — Pillsbury Winthrop Shaw Pittman LLP

(57) ABSTRACT

A laminate film comprising a core layer comprising of a high crystalline propylene homopolymer blended with an amount of hydrocarbon resin; crystalline polyethylene wax; and a fluoropolymer and/or a metal oxide nanoparticle which exhibits excellent transparency and moisture vapor barrier properties. The laminate film could further have additional layers such as a second polyolefin resin-containing layer, or a heat-sealable polyolefin-containing layer, or combinations thereof.

21 Claims, 1 Drawing Sheet

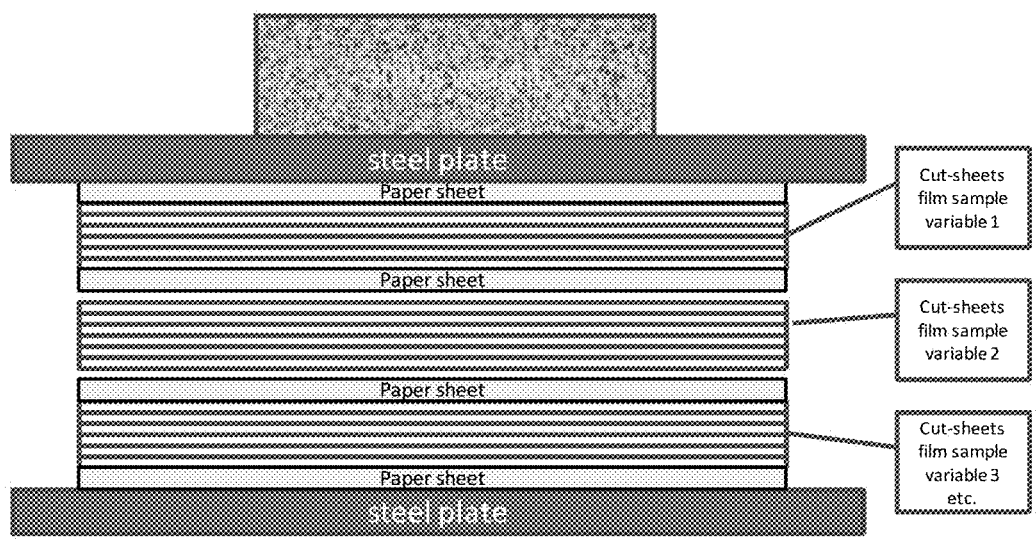

BIAXIALLY ORIENTED POLYPROPYLENE FILM WITH LOW MOISTURE VAPOR TRANSMISSION RATE

FIELD OF INVENTION

This invention relates to a multi-layer biaxially oriented polypropylene film (BOPP) comprising novel blends of isotactic crystalline propylene homopolymer with crystalline polyethylene waxes, hydrocarbon resins, fluoropolymers, and/or metal oxide nanoparticles; for improved moisture vapor barrier properties. The novel film formulation results in a film with excellent high moisture vapor barrier properties which are superior to film formulation blends using such waxes, hydrocarbon resins, fluoropolymers, or nanoparticles, singly. In addition, high transparency and gloss of the film can be maintained, and little loss of surface energy after aging was found with these film formulations, ensuring retention of good ink adhesion and printability.

BACKGROUND OF INVENTION

Biaxially oriented polypropylene (BOPP) films used for packaging applications perform multiple functions. It must perform in a lamination to provide moisture and/or oxygen barrier; it must provide a heat sealable layer for bag forming and sealing, or a layer that is suitable for receiving an adhesive either by coating or laminating; often it must also provide a surface suitable for printing to display graphic designs.

U.S. Pat. No. 5,500,282 describes the use of high crystalline content propylene homopolymer with an intermolecular stereoregularity greater than 93% mixed with "a moisture barrier improving amount of polyterpene resin." This formulation provides an oriented film structure of improved water vapor transmission rate.

U.S. Pat. No. 5,667,902 describes the use of blending a high crystalline propylene homopolymer having an isotactic stereoregularity of greater than about 93%, with a second propylene homopolymer having an isotactic stereoregularity of from about 90% to about 93%, and a resin modifier wherein the resin modifier is hydrogenated hydrocarbon resin.

U.S. Pat. No. 6,503,611 describes the use of blends of propylene-based polymers with crystalline waxes as a cold seal release layer. Release properties are adequate; however, processability is an issue with the low molecular weight waxes causing 1) die build-up issues; 2) smoke generation; 3) tendency to stick to downstream rollers in tentering operations. Also, since the wax is a component of a relatively thin skin layer, there are no substantial improvements in moisture barrier or oxygen barrier properties.

U.S. Pat. No. 6,033,514 describes the use of multilayer biaxially oriented polypropylene films with improved moisture vapor transmission rates by formulating a core resin layer with an amount of crystalline wax. This core layer is then encapsulated by polyolefin cap layers to help prevent blooming of the wax to the surface and causing plate-out issues. However, the cap layers utilized by this patent are non-polar polyolefins and the wax can readily migrate from the core layer into and through the cap layers and onto the surface of the cap layer. Thus, although the rate of wax migration may be more controlled, it still occurs nevertheless, and is still prone to the afore-mentioned plate-out issues.

U.S. Pat. No. 6,033,771 describes the use of waxes to improve moisture and oxygen barrier properties of multi-layer BOPP films. In this invention, the wax is blended into a core layer and an intermediate cavitated layer between the core layer and surface layer is used to entrap the wax within its voids and prevent its migration to the surface, thus avoiding plate-out problems. However, the cavitation of the intermediate layer renders said invention opaque and is no longer transparent.

U.S. Pat. No. 5,141,801 describes the use of wax incorporated into a crystalline polyolefin layer for improved moisture barrier properties with an interior layer of EVOH to prevent migration of the wax through the surface. The EVOH also provides oxygen gas barrier properties to the film structure. However, the EVOH layer is susceptible to environmental humidity conditions and consequent loss of barrier properties. Thus, this patent recommends encapsulating the EVOH layer with a second wax-containing polyolefin blend layer to protect the EVOH from moisture diffusion. However, this second wax-containing layer in such multilayer structure means that the wax is free to migrate to its surface and continue to cause plate-out issues.

This invention seeks to provide an economical, transparent, improved moisture barrier BOPP film that avoids some of the disadvantages of the prior art films.

SUMMARY OF THE INVENTION

The inventors have found a film formulation that provides improved moisture barrier properties for transparent multi-layer biaxially oriented polypropylene-based films using a blend of crystalline polyethylene waxes, hydrocarbon resins, and a fluoropolymer additive in the polypropylene-based core layer of said film. In addition, it has been found that the use of these core layer additives with nano-particles of zinc oxide (ZnO) or aluminum oxide ($Al_2O_3$) can further enhance moisture vapor barrier properties.

The propylene homopolymer used in the core layer is preferably a high crystalline content homopolymer with an isotactic index of 95% or greater (as measured by $^{13}C$ NMR spectra). However, other propylene homopolymers may be used, such as conventional homopolymers of 90-95% isotactic index; or "mini-random" ethylene-propylene copolymers in which the ethylene content is less than 1 wt %, typically 0.2-0.8 wt %.

One embodiment may be a 2-layer coextruded laminate film comprising a core layer and a skin layer comprising of a polyolefin such as ethylene homopolymer, propylene homopolymer, ethylene or propylene-based copolymers (e.g. ethylene-propylene, ethylene-butene, propylene-butene, ethylene-propylene-butene), or blends thereof. The laminate film is preferably oriented, either mono-axially in either the machine or transverse direction; and more preferably, is biaxially oriented in both the machine and transverse directions. The core layer comprises a crystalline propylene homopolymer (preferably high crystalline) and an amount of crystalline polyethylene wax, hydrocarbon resin, fluoropolymer additive, and/or a nanoparticle. The skin layer could function as a heat sealable layer or be formulated for winding properties, adhesion properties, or printing properties. In addition, the side of the core layer opposite the skin layer could be discharge-treated to allow for higher surface energy for suitability for receiving coatings, ink printing, metallization, or for lamination to another substrate with adhesives.

A second embodiment could be a 3-layer coextruded laminate film comprising a core layer and a second skin layer disposed upon one side of the core layer and a third skin layer disposed on the side of the core layer opposite that of the second skin layer. The laminate film is preferably oriented, either mono-axially in either the machine or transverse direction; and more preferably, is biaxially oriented in both the machine and transverse directions. The core layer comprises a crystalline propylene homopolymer (preferably high crystalline) and an amount of crystalline polyethylene wax, hydrocarbon resin, fluoropolymer additive, and/or a nanoparticle. The second skin layer could comprise a polyolefin such as ethylene homopolymer, propylene homopolymer, ethylene or propylene-based copolymers (e.g. ethylene-propylene, ethylene-butene, propylene-butene, ethylene-propylene-butene), or blends thereof; and function as a heat sealable layer or be formulated for winding properties, adhesion properties, or printing properties. The third skin layer may also comprise a propylene homopolymer (e.g. crystalline isotactic or syndiotactic polypropylene), copolymer; or an ethylene homopolymer (e.g. high density polyethylene), copolymer; or blends thereof. The outer surface of this third skin layer may also be discharge-treated to allow for higher surface energy for suitability for receiving coatings, ink printing, metallization, or for lamination to another substrate with adhesives. Other embodiments may also be contemplated in which intermediate layers may be disposed between the core layer and the respective second and/or third skin layers as desired.

Another embodiment is a method for flexible packaging comprising obtaining a laminate film comprising a polyolefin resin-containing layer of high crystalline polypropylene and crystalline polyethylene wax, a hydrocarbon resin, a fluoropolymer additive, and/or a nanoparticle; and surrounding a product by the laminate film. Preferably, the product is a food product.

In yet another embodiment, this invention provides biaxially oriented polyolefin multi-layer films with a core layer of high crystalline polypropylene and crystalline polyethylene waxes; a hydrocarbon resin; a fluoropolymer additive; and/or a nanoparticle; to enhance barrier and printing properties for flexible packaging purposes. An additional embodiment provides laminate structures of polyolefin layers of high crystalline polypropylene and crystalline polyethylene waxes; hydrocarbon resin; fluoropolymer additive; and/or nanoparticle; for moisture barrier applications in flexible packaging.

This invention provides a method to improve the moisture barrier properties of preferably biaxially oriented films, resulting in a high moisture barrier packaging film with excellent transparency and machinability. The invention helps solve the problem associated with the prior art of surface defects, processability issues, and limitations of moisture barrier properties.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIG. 1 shows the test setup for the forced-aging of test films.

DETAILED DESCRIPTION OF THE INVENTION

It has been found that biaxially oriented propylene-based films comprising a core or base layer of: high crystalline isotactic propylene homopolymer (HCPP); an amount of crystalline polyethylene wax; an amount of hydrocarbon resin (HCR); an amount of fluoropolymer additive; and/or an amount of a metal oxide nanoparticle; can provide a transparent film with significantly improved gas barrier properties, particularly moisture vapor barrier. In addition, the inventive film also demonstrated excellent transparency and gloss, processability, and little or no migration of the low molecular weight waxes and the fluoropolymer additive as shown by surface energy measurements after forced-heat aging of the film.

In one embodiment of the invention, the laminate film comprises: a skin layer (A) comprising an isotactic polypropylene or "mini-random" ethylene-propylene copolymer or a mixed resin layer blend of isotactic propylene homopolymer with an amount of ethylene-propylene copolymer or blends thereof, with one side discharge-treated for high surface energy suitable for printing or coating; an isotactic high crystalline propylene homopolymer core layer (B) blended with an amount of crystalline polyethylene wax, a hydrocarbon resin, a fluoropolymer additive, and/or a metal oxide nanoparticle, disposed on one side of the said mixed resin skin layer, opposite the discharge-treated side; and a heat sealable ethylene-propylene-butene terpolymer skin layer (C) coextruded onto the side of the core layer opposite the mixed resin skin layer side.

The polypropylene resin-containing core layer (B) is a crystalline polypropylene of specific isotactic content and can be uniaxially or biaxially oriented, preferably biaxially oriented. Crystalline polypropylenes are generally described as having an isotactic content of about 90% or greater. Preferably, in order to impart improved moisture barrier properties, a high crystalline polypropylene is recommended, generally described as having an isotactic index of 95% or greater. A higher crystallinity propylene homopolymer is preferred for the oriented film core layer construction as a higher degree of crystallinity equates to less amorphous regions within the core layer. Such amorphous regions are believed to be the pathway for gas diffusion through the film, so a less amorphous/more crystalline film design should be better for gas barrier. Suitable examples of high crystalline polypropylenes for this invention are Total Petrochemical's 3270, LyondellBasell's HP2409, or Phillips 66's CH020XK. These resins have melt flow rates of about 0.5 to 5 g/10 min, a melting point of about 159-165° C., a crystallization temperature of about 108-126° C., a heat of fusion of about 86-110 J/g, a heat of crystallization of about 105-111 J/g, and a density of about 0.91. The isotactic index of these high crystalline polypropylene grades are about 97% or greater as measured by $^{13}C$ NMR spectra of the resins dissolved in a 1,2,4-trichlorobenzene solution at 130° C. and obtaining the percent isotacticity from the intensity of the isotactic methyl group at 21.7 ppm vs. the total isotactic and atactic methyl groups from 22-19.4 ppm. The core resin layer is typically 5 µm to 50 µm in thickness after biaxial orientation, preferably between 10 µm and 25 µm, and more preferably between 12 µm and 16 µm in thickness.

The core resin layer (B) also is comprised of an amount of crystalline polyethylene wax in an amount of about 0.1-5.0 wt. % of the core layer. Preferably the amount is between about 0.5-3.0 wt %, and more preferably between about 1-2 wt % of the core layer. A suitable crystalline polyethlyene wax is a fully saturated synthetic wax grade available from Baker Hughes as Polywax™ 500 which is characterized as having a melting point of 88° C., a density (at 25° C.) of around 0.93-0.95 g/cm$^3$, a viscosity at 99° C. of ca. 7 cP, needle penetration at 25° C. of 10.0 (dmm), a polydispersity of around 1.08, and a heat of fusion of 205 Jg. It can also be contemplated to use Fischer-Tropsch waxes such as a grade available from Sasol Wax—C80—which is characterized as having a congealing point of 78-83° C., drop melting point of 88° C., kinematic viscosity at 100° C. of 0.4 cSt, needle penetration at 25° C. of 6 (0.1 mm), needle penetration at 65° C. of 66 (0.1 mm), and oil content of maximum 0.75 mass %.

An amount of hydrocarbon resin is included in the core layer to aid in orientation stretching of the high crystalline polypropylene to reduce unstretched or uneven stretch marks and film breaks as well as help improve moisture barrier properties. Suitable loadings of hydrocarbon resin of up to 15 wt % of the core layer can be used. Preferably, 1-10 wt % hydrocarbon resin in the core layer alleviates any processing or stretching issues found with the high crystalline polypropylenes and also helps further in reducing moisture transmission. A suitable hydrocarbon resin grade is one from ExxonMobil Oppera™ PR100A. This hydrocarbon resin is a polydicyclopentadiene resin with a softening point of 137.7° C. and a color of 1.2 YI (yellowness index). It is most conveniently used in a masterbatch (MB) form, from 10-60 wt %, preferably 50 wt % loading in a carrier of propylene homopolymer. Other hydrocarbon resins may be contemplated for use, such as available from Eastman Chemical's Plastolyn™ R1140 hydrogenated hydrocarbon resin with a softening point of 135-145° C. (ring & ball); density of about 0.98 g/cm$^3$; molecular weight $M_w$ of 1500 and $M_n$ of 900 ($M_w/M_n$=1.7); and color of minimum −1 and maximum+5 (Hunterlab b, 50% resin solids in toluene, 5 cm path length).

An amount of fluoropolymer additive is also included in the core layer in an amount of about 100-1000 ppm of the core layer, preferably 300-600 ppm of the core layer. This fluoropolymer is typically available as a processing aid in a masterbatch form and is typically polymerized from two monomers—hexafluoropropylene and vinylidene fluoride—to form a poly(vinylidene) fluoride-co-hexafluoropropylene polymer (1,1-difluoroethylene-1,1,2,3,3,3-hexafluoro-1-propene copolymer). This fluoropolymer typically has a weight average molecular weight $M_w$ of about 400,000 to 455,000; a number average $M_n$ of about 110,000 to 130,000; a melting point of about 135-140° C.; melt flow rate of about 4-10 g/10 min at 230° C.; viscosity of about 20,000 to 25,000 poise at 230° C. and 100 sec$^{-1}$; and a density of about 1.78 g/cm$^3$. A suitable supplier of the fluoropolymer masterbatch is Ampacet Corporation with suitable grades such as Ampacet 401198 (a 3 wt % loading of fluoropolymer in a propylene homopolymer carrier resin) or Ampacet 402810 (a 1 wt % loading of fluoropolymer in a propylene homopolymer carrier resin). These masterbatches typically have a density of about 0.90-0.92 g/cm$^3$ and a melt flow rate of 3-12 g/min at 230° F.

Optionally, a metal oxide nanoparticle may also be added to the core layer of the multilayer laminate film. Suitable amounts can be up to about 0.5 wt % of the core layer, preferably about 0.01-0.4 wt % (100-4000 ppm). The metal oxide nanoparticles are preferably comprised of aluminum oxide ($Al_2O_3$) or zinc oxide (ZnO), although other metal oxides nanoparticles may be contemplated (e.g. titanium oxide $TiO_2$). The metal oxide nanoparticles are on the order of 20-200 nm for average particle size, preferably 60-150 nm average particle size. Suitable metal oxide nanoparticles can be obtained from Nanophase Technologies Corporation under grade names NanoTek® or NanoArc®. NanoArc® ZN-2656, ZN-2456, ZN-8431, and ZN-8631 are zinc oxide nanoparticles with average particle sizes of 60 nm (ZN-2656, ZN-8631) and 40 nm (ZN-2456, ZN-8431); are dispersed in water (ZN-2646, ZN-2456) or polypropylene (ZN-8631, ZN-8431); and can have a hydrophobic, non-polar surface treatment (ZN-8631, ZN-8431). Aluminum oxide nanoparticles can be obtained from Nanophase Technologies Corporation as NanoArc® AL-2255, AL-2456, AL-2156, and AB8700PP. These nanoparticles have average particle sizes of 20 nm (AL-2255), 40 nm (AL-2456), and 151 nm (AL-2156, AB8700PP); and are dispersed in water (AL-2255, AL-2456, AL-2156) or polypropylene (AB8700PP). Preferably, the polypropylene-dispersed nanoparticles (e.g. ZN-8631, ZN-8431, AB8700PP) are used for ease of blending and dispersion throughout the polypropylene-based core layer of the film. These latter preferred grades are white powders or flakes comprised of about 50 wt % of the respective metal oxide nanoparticle dispersed in about 50 wt % of polypropylene. For further convenience for handling and processing ease for dry blending with other resin components, a masterbatch of 8 wt % of the nanoparticle/polypropylene powder was compounded in a polypropylene resin carrier such that the active metal oxide nanoparticle content was 4 wt % of the masterbatch.

Without being bound by any theory, the crystalline ethylene wax, the hydrocarbon resin, and the fluoropolymer or metal oxide nanoparticle additives incorporated in the core layer of the film are believed to improve the moisture vapor barrier of the laminate film by various mechanisms. In the case of crystalline waxes, it is believed that when blended with a non-polar polyolefin and melt-extruded into a film, the crystalline wax will be driven or migrate to the outside surface of the film layer. This crystallized wax on the outermost layer of the film will act as a barrier to moisture vapor and gas. A higher degree of crystallinity of the crystalline wax can be desirable as it may improve further the gas barrier. As the degree of wax crystallinity and wax density are correlatable, the higher the wax density, the higher the wax's crystallinity proportionally. Polyethylene wax densities on the order of 0.93 or higher (preferably 0.95 or higher) can be desirable for better gas barrier properties. In the case of hydrocarbon resins, however, it is believed that the mechanism for gas barrier improvement is that the glassy hydrocarbon resin will reside within the amorphous regions of the oriented polypropylene film and by doing so, will effectively act as "plugs" to help reduce gas diffusion through the amorphous regions. The use of hydrocarbon resin in the high crystalline/high isotactic content propylene-homopolymer core layer can also provide some additional benefits: 1) it can improve the stiffness, modulus, and dead-fold properties of the film since it is believed that the presence of the hydrocarbon resin in the amorphous regions of the film can act like a physical crosslink in restricting movement of the polymer chains; and 2) can act as a process aid for the extrusion of high crystalline propylene homopolymers to lower melt pressures and improve output. In the case of the fluoropolymer additive, although they are typically used as a processing aid to prevent die lip build-up in extrusion systems and are generally used in the outermost skin layer in order for the fluoropolymer to coat the extrusion system die lip surfaces, the inventors have surprisingly found that the use of an amount of fluoropolymer additive in the core layer enhances moisture vapor barrier properties when used in conjunction with the crystalline wax. It is believed that the fluoropolymer additive may help improve the homogeneous dispersion of the crystalline polyethylene wax and thus improve the formation of the crystalline wax layer on the outer surface of the film. In the case of adding an amount of metal oxide nanoparticles as part of the inventive film, it is hypothesized that the nanoparticles can help store the crystalline polyethylene waxes as a reservoir within the film itself. It is possible that the metal oxide nanoparticles reside within the amorphous regions of the propylene-based resin core layer and that this reservoir of crystalline wax contained within the nanoparticles could act like a hydrocarbon resin does in impeding and reducing gas transmission through the amorphous regions.

The first skin layer (A) disposed upon one side of the core layer (B) can comprise an isotactic polypropylene or "mini-random" ethylene-propylene copolymer or a high density ethylene homopolymer, or a mixed resin layer blend of isotactic propylene homopolymer with an amount of ethylene-propylene copolymer, or other blend combinations thereof, with one side discharge-treated for high surface energy suitable for printing or coating. High crystalline propylene homopolymers can be used as described previously, but it may be preferable to use a more conventional non-high crystalline homopolymer for easier extrusion processing. Suitable examples of a conventional non-high crystalline propylene-based polymer can be Total Petrochemical grade 3271, a crystalline isotactic propylene homopolymer of about 93% isotactic index; or Phillips 66 CH016. A preferred embodiment is to use mini-random ethylene-propylene copolymers which have an ethylene content of less than 1 wt % of the polymer, preferably about 0.3-0.8 wt %. Suitable examples of such resin grades can be Total Petrochemical 3374HA or Phillips 66 CR027 or CR035 grades. This skin layer (A) can be coextruded on one side of the core layer (B) and have a thickness after biaxial orientation between 0.1 and 5 µm, preferably between 0.5 and 3 µm, and more preferably between 0.5 and 1.0 µm. For this skin layer, it is also contemplated to add an antiblock to aid in film handling. A small amount of inorganic antiblocking agent may be optionally added up to 1000 ppm to this resin layer. Preferably 300-500 ppm of antiblock may be added. Suitable antiblock agents comprise those such as inorganic silicas, sodium calcium aluminosilicates, crosslinked silicone polymers such as polymethylsilsesquioxane, and polymethylmethacrylate spheres. Typical useful particle sizes of these antiblocks range from 1-12 um, preferably in the range of 2-4 um.

The skin layer (A) can be surface-treated with a corona-discharge method, flame treatment, atmospheric plasma, or corona discharge in a controlled atmosphere of nitrogen, carbon dioxide, or a mixture thereof. The latter treatment method in a mixture of $CO_2$ and $N_2$ is preferred. This method of discharge treatment results in a treated surface that comprises nitrogen-bearing functional groups, preferably 0.3% or more nitrogen in atomic %, and more preferably 0.5% or more nitrogen in atomic %. (This is different from corona-discharge treatment in air or flame treatment as the treated surface in these cases result in only oxygen-bearing functional groups and no or less than 0.3 atomic % nitrogen species.) The treated surface of the skin layer (A) can then be metallized, printed, coated, or extrusion or adhesive laminated thereupon.

A second skin layer (C) may be coextruded with the core layer (B) opposite the first skin layer (A), and have a thickness after biaxial orientation between 0.2 and 5 um, preferably between 0.6 and 3 um, and more preferably between 1.0 and 2.0 µm. The skin layer (C) can be a heat-sealable layer or a non-heat-sealable layer. Preferably, the skin layer (C) is a heat-sealable layer. The heat-sealable layer may contain an anti-blocking agent and/or slip and antiblock additives for good machinability and a low coefficient of friction, in a loading of about 0.05-0.5% by weight of the heat-sealable layer, preferably about 0.2-0.4 wt %. Suitable non-migratory antiblock agents comprise those such as inorganic silicas, sodium calcium aluminosilicates, crosslinked silicone polymers such as polymethylsilsesquioxane, and polymethylmethacrylate spheres. Typical useful particle sizes of these antiblocks range from 1-12 um, preferably in the range of 2-4 um. Suitable migratory slip agents can comprise those such as fatty amides including but not limited to: stearamide, erucamide, behenamide, or other fatty amides, and combinations thereof; silicone oils of low molecular weight to ultra-high molecular weight gels; and/or combinations of the foregoing. Typical loadings of such slip agents can be from 0.01-0.5 wt % of the skin layer, preferably 0.1-0.3 wt %. (Such migratory slip agents may also be preferentially added to the core layer (B) as well in similar wt % ranges of the core layer.) The heat-sealable layer can be any polyolefin that has a lower melting point than that of the isotactic crystalline propylene-based resin of the core layer such as polyethylene, copolymers of ethylene, poly-butenes, copolymers of butene, and blends thereof, but preferably is a copolymer of propylene, either ethylene-propylene or butylene-propylene, and preferably comprises a ternary ethylene-propylene-butene copolymer, or blends thereof. A suitable heat-sealable terpolymer resin is Sumitomo SPX78R6 which has a nominal melt flow rate of ca. 9 g/10 min at 230° F., color (Yellow Index) of −5.0 to 6.0, and pellet size of 40-70 pellets/gram. A suitable heat-sealable ethylene-propylene copolymer example can be Total 8573 or 8473 with a nominal melt flow rate of about 8 or 4 g/10 min at 230° F., respectively; or LyondellBasell Adsyl™ 7416 XCP with a nominal melt flow of about 7.5 g/10 min at 230° F.

If the inventive multi-layer film comprises a non-heat-sealable, winding layer (C), this layer can comprise a crystalline polypropylene with anti-blocking and/or slip additives or a matte layer of a block copolymer blend of polypropylene and one or more other polymers whose surface is roughened during the film formation step so as to produce a matte finish on the winding layer. Preferably, the surface of the winding layer is discharge-treated to provide a functional surface for lamination or coating with adhesives and/or inks.

The coextrusion process includes a three-layered compositing die for a 3-layer coextruded film embodiment. The polymeric core layer (B) is sandwiched between the skin layer (A) and the heat-sealable or winding layer (C). The three layer laminate sheet is cast onto a cooling drum whose surface temperature is controlled between 20° C. and 85° C. to solidify the non-oriented laminate sheet. The non-oriented laminate sheet is stretched in the longitudinal direction at about 95 to 165° C. at a stretching ratio of about 4 to about 5 times the original length and the resulting stretched sheet is cooled to about 50° C. to 100° C. to obtain a heat-set, minimally shrinkable, uniaxially oriented laminate sheet. The uniaxially oriented laminate sheet is introduced into a tenter and preliminarily heated between 130° C. and 180° C., and stretched in the transverse direction at a stretching ratio of about 7 to about 12 times the original length and then heat-set to give a biaxially oriented sheet with minimal thermal shrinkage. The biaxially oriented film has a total thickness between 6 and 50 µm, preferably between 15 and 20 µm.

This invention will be better understood with reference to the following examples, which are intended to illustrate specific embodiments within the overall scope of the invention.

Example 1

A 3-layer coextruded film was made on a nominal 1.6 m wide biaxial orientation line, comprising of a core layer (B), a skin layer (A) on one side of the core layer, and a heat-sealable skin layer (C) on the side of the core layer opposite that of the skin layer (A). The core layer comprised of about 73 wt % high crystalline polypropylene Total Petrochemical 3270 of the core layer; about 20 wt % of the core layer of a masterbatch of 50 wt % ExxonMobil hydrocarbon resin PR100A in a crystalline isotactic propylene homopolymer (e.g. Total Petrochemical 3271) carrier resin, such that the active amount of hydrocarbon resin was about 10 wt % of the core layer; an amount of Baker Hughes Polywax™ 500 crystalline polyethylene wax at about 1 wt % of the core layer; and an amount of fluoropolymer masterbatch Ampacet 402810 at about 6 wt % of the core layer, such that the active amount of fluoropolymer was about 600 ppm (0.06 wt %) in the core layer. The skin layer (A) coextruded upon one side of the core layer (B) comprised about 100 wt % of the skin layer of Total Petrochemical 3374HA ethylene-propylene mini-random copolymer, which also contained about 300 ppm of a nominal 3 µm particle size antiblock of a spherical sodium calcium aluminum silicate. The skin layer (C) was coextruded upon the side of the core layer (B) opposite the skin layer (A) comprising of about 100 wt % of the skin layer of ethylene-propylene-butene terpolymer sealant Sumitomo SPX78R6 which also contained about 4000 ppm of a nominal 2 µm particle size antiblock of a spherical crosslinked silicone polymer. The total thickness of this 3-layer coextruded film substrate after biaxial orientation was nominal 80G or 0.8 mil or 20 µm. The thickness of the skin layer (A) and sealant skin layer (C) after biaxial orientation was nominal 4G (1 µm) and 6G (1.5 µm), respectively. The thickness of the core layer after biaxial orientation is nominal 70G (17.5 µm). The skin layer (A) and core layer (B) were melt-extruded at about 450-550° F. (ca. 232-288° C.). The sealant layer (C) was melt-extruded at 400-480° F. (ca. 204-249° C.). The 3-layer coextrudate was passed through a flat die to be cast on a chill drum of about 100-180° F. (ca. 38-82° C.). The formed cast sheet was passed through a series of heated rolls at about 210-270° F. (ca. 99-132° C.) with differential speeds to stretch in the machine direction (MD) from 4 to 6 stretch ratio. This was followed by transverse direction (TD) stretching from 8 to 10 stretch ratio in the tenter oven at about 310-350° F. (ca. 154-177° C.). After transverse stretching, the film was heat-set to minimize shrinkage (the film having a heat shrinkage or thermal dimensional stability of less than 10% in both the MD and TD when tested in accordance to ASTM D1204 at about 140° C. for 15 minutes) and was treated via corona discharge treatment upon the side of skin layer (A) opposite the core layer (B). The film was wound into roll form. The film was then tested for appearance, optical properties such as haze and gloss, gas barrier properties, and wetting tension (surface energy). The film was also force-aged by placing it in a conditioning oven at an elevated temperature above room temperature for several hours in order to force any migratory components to the film's surface. Wetting tension was measured on the discharge-treated surface after such force-aging and compared with wetting tension before force-aging.

Example 2

A process similar to Example 1 was repeated except that the core resin layer comprised a blend of: about 69 wt % Total 3270; about 20 wt % ExxonMobil PR100A hydrocarbon resin masterbatch (effective hydrocarbon resin amount ca. 10 wt %); about 1 wt % Polywax™ 500 crystalline polyethylene wax; and about 10 wt % of a ZnO nanoparticle masterbatch in a polypropylene carrier resin (in which the NanoArc® ZN-8631 ZnO nanoparticle was at about 4 wt % loading of the masterbatch) such that the active nanoparticle amount was about 0.4 wt % of the core layer. The film was tested for properties as in Example 1.

Example 3

A process similar to Example 1 was repeated except that the core resin layer comprised of a blend of: about 69 wt % Total 3270; about 20 wt % ExxonMobil PR100A hydrocarbon resin masterbatch (effective hydrocarbon resin amount ca. 10 wt %); about 1 wt % Polywax™ 500 crystalline polyethylene wax; and about 10 wt % of an $Al_2O_3$ nanoparticle masterbatch in a polypropylene carrier resin (in which the NanoArc® AB-8700PP $Al_2O_3$ nanoparticle was at about 4 wt % loading of the masterbatch) such that the active nanoparticle amount was about 0.4 wt % of the core layer. The film was tested for properties as in Example 1.

Comparative Example 1

A process similar to Example 1 was repeated except that the core resin layer comprised a blend of: about 80 wt % Total 3270 high crystalline propylene homopolymer; and about 20 wt % ExxonMobil PR100A hydrocarbon resin masterbatch (effective hydrocarbon resin amount ca. 10 wt %). No crystalline polyethylene wax, fluoropolymer, or metal oxide nanoparticles were used. The resultant film was then tested for properties.

Comparative Example 2

A process similar to Example 1 was repeated except that the core resin layer comprised a blend of: about 79 wt % Total 3270 high crystalline polypropylene; 20 wt % ExxonMobil PR100A hydrocarbon resin masterbatch (i.e. 10 wt % active hydrocarbon resin); and about 1 wt % Polywax™ 500 crystalline polyethylene wax. No Ampacet 402810 fluoropolymer masterbatch or metal oxide nanoparticles were used. The resultant film was then tested for properties.

The properties of the Examples and Comparative Examples ("CEx.") are shown in Tables 1a, 1b and 2. Table 1a summarizes the core layer (B) formulations of the respective Examples and Comparative Examples in terms of the master batches (MB) for convenience. Table 1b summarizes the core layer (B) formulations of the respective Examples and Comparative Examples in terms of the active amount of each ingredient. Table 2 summarizes the primary test results of the exemplary films.

TABLE 1(a)

| | Core Layer B Composition wt % | | | | |
|---|---|---|---|---|---|
| Sample | HCPP | HCR MB | PE Wax | Fluoropolymer MB | Metal Oxide Nanoparticle MB |
| Ex. 1 | 73 | 20 | 1 | 6 | 0 |
| Ex. 2 | 69 | 20 | 1 | 0 | 10 (ZnO) |
| Ex. 3 | 69 | 20 | 1 | 0 | 10 ($Al_2O_3$) |
| CEx. 1 | 80 | 20 | 0 | 0 | 0 |
| CEx. 2 | 79 | 20 | 1 | 0 | 0 |

TABLE 1(b)

| | Core Layer B Composition wt % | | | | |
|---|---|---|---|---|---|
| Sample | HCPP | HCR | PE Wax | Fluoropolymer | Metal Oxide Nanoparticle |
| Ex. 1 | 88.94 | 10 | 1 | 0.06 | 0 |
| Ex. 2 | 88.6 | 10 | 1 | 0 | 0.4 (ZnO) |
| Ex. 3 | 88.6 | 10 | 1 | 0 | 0.4 ($Al_2O_3$) |
| CEx. 1 | 90 | 10 | 0 | 0 | 0 |
| CEx. 2 | 89 | 10 | 1 | 0 | 0 |

TABLE 2

| Sample | Gloss A-side | Gloss C-side | Haze (%) | MVTR g/100 in²/day | Printability after aging A-side Rank: 1-4 (1 = poor, 4 = good) | Wetting Tension A-side dyne-cm/cm² | | |
|---|---|---|---|---|---|---|---|---|
| | | | | | | Before aging | After aging | % change after aging |
| Ex. 1 | 127 | 97 | 2.1 | 0.132 | 3 | 39 | 36 | 7.7% |
| Ex. 2 | 131 | 107 | 2.9 | 0.147 | 3 | 39 | 37 | 5.1% |
| Ex. 3 | 126 | 93 | 2.4 | 0.166 | 3 | 39 | 37 | 5.1% |
| CEx. 1 | 130 | 97 | 2.6 | 0.196 | 3 | 42 | 41 | 2.4% |
| CEx. 2 | 128 | 102 | 3.3 | 0.188 | 3 | 38 | 35 | 7.9% |

As Table 2 shows, Comparative Example 1 (CEx 1), using a core layer (B) of about 80 wt % high crystalline 3270 propylene homopolymer and 20 wt % hydrocarbon resin masterbatch, had a MVTR barrier property at about 0.196 g/100 in²/day (3.04 g/m²/day). Transparency and gloss were good as indicated by the low haze number of 2.6% and high gloss numbers for the surfaces of skin layers (A) and (C) at 130 and 97, respectively. Wetting tension before and after forced-aged testing and printability after forced-aged testing were good, with only a 2.4% change in wetting tension after aging.

Example 1 (Ex. 1) shows very good moisture barrier properties of 0.132 g/100 in²/day (2.05 g/m²/day), nearly a 50% reduction in moisture transmission rate over CEx. 1. Thus, the addition of crystalline polyethylene wax and the fluoropolymer additive to the high crystalline polypropylene/hydrocarbon resin core composition significantly improved moisture barrier properties. In terms of optical properties, haze was very comparable to CEx. 1 at 2.1%; gloss was also very comparable for skin layer surfaces (A) and (C) at 127 and 97, respectively. Change in wetting tension was higher than CEx. 1 at 7.7%, but still less than a 10% difference from before forced-aging. Printability remained acceptable and same as CEx. 1.

The laminate film has a moisture vapor transmission rate of 0.185 g/100 in²/day or less, 0.180 g/100 in²/day or less, 0.175 g/100 in²/day or less, 0.170 g/100 in²/day or less, 0.165 g/100 in²/day or less, 0.160 g/100 in²/day or less, 0.155 g/100 in²/day or less, 0.150 g/100 in²/day or less, 0.145 g/100 in²/day or less, 0.140 g/100 in²/day or less, 0.135 g/100 in²/day or less, 0.130 g/100 in²/day or less, 0.125 g/100 in²/day or less and 0.120 g/100 in²/day or less.

Example 2 (Ex. 2) used as a core layer a blend of high crystalline polypropylene, hydrocarbon resin, polyethylene wax, and zinc oxide nanoparticles. Moisture vapor transmission barrier was significantly improved at 0.147 g/100 in²/day (2.28 g/m²/day) versus CEx. 1 by ca. 33%. Good transparency was also maintained by the acceptable haze value of 2.9. Gloss was also maintained satisfactorily on both skin layer surfaces (A) and (C) at 131 and 107. Printability remained comparable to CEx. 1 and the change in wetting tension before and after forced-aging remained satisfactory at only a 5.1% reduction.

Example 3 (Ex. 3) used as a core layer a blend of high crystalline polypropylene, hydrocarbon resin, polyethylene wax, and aluminum oxide nanoparticles. Moisture vapor transmission barrier was significantly improved at 0.166 g/100 in²/day (2.57 g/m²/day) versus CEx. 1 by ca. 18%. Good transparency was also maintained by the acceptable haze value of 2.4. Gloss was also maintained satisfactorily on both skin layer surfaces (A) and (C) at 126 and 93. Printability remained comparable to CEx. 1 and the change in wetting tension before and after forced-aging remained satisfactory at only a 5.1% reduction.

Comparative Example 2 (CEx. 2) was similar to Example 1 except that CEx. 2 omitted the fluoropolymer additive. With this change, the moisture vapor transmission rate increased to 0.188 g/100 in²/day (2.91 g/m²/day), comparatively about the same as CEx. 1 and higher than Ex. 1 (and Ex.'s 2 and 3). Thus, the absence of the fluoropolymer component—and using only the crystalline polyethylene wax additive in addition to the hydrocarbon resin—had a significant worse effect upon moisture vapor barrier properties. CEx. 2's haze and gloss remained acceptable. Printability property was maintained and the change in wetting tension after forced-aging was similar to Ex. 1 at 7.9%.

Based on the results of the foregoing Examples and Comparative Examples, it appears that there is a synergistic effect on improved moisture vapor barrier by using the combination of hydrocarbon resin, crystalline polyethylene wax, fluoropolymer additive and/or a metal oxide nanoparticle. Examples 1-3—which utilize a combination of hydrocarbon resin and polyethylene wax with either fluoropolymer or metal oxide nanoparticle—showed significantly improved moisture barrier properties versus Comparative Examples that omitted one of these components. For example, CEx. 1, which omitted all these components save for the hydrocarbon resin, exhibited a significantly higher moisture vapor transmission rate (i.e. lower moisture vapor barrier) than the inventive Examples 1-3. CEx. 2, which omitted the fluoropolymer and the nano-metal oxide components but included the PE wax, still exhibited significantly higher moisture vapor transmission rate than the inventive Examples 1-3.

It is also noted that the inventive Examples continued to exhibit good film optical properties with low haze and high gloss; good printability properties upon the corona discharge-treated surface; and good retention of wetting tension properties of the discharge-treated surface after forced-aging.

Thus, there has been found a solution to provide significantly improved transparent moisture vapor barrier films utilizing a combination of hydrocarbon resins, crystalline polyethylene waxes, fluoropolymer additive and/or metal oxide nanoparticles as part of a high crystalline polypropylene core layer. Such an inventive combination of additives also maintained high transparency (low haze), high gloss, and good printability, and wetting tension properties of the film.

Test Methods

The various properties in the above examples were measured by the following methods:

Moisture transmission rate of the film was measured by using a Mocon Permatran 3/31 unit measured substantially in accordance with ASTM F1249. In general, the preferred value was an average value equal to or less than 0.17 g/100 in$^2$/day (2.64 g/m$^2$/day.

Haze of the film was measured using a BYK Gardner Instruments "Haze-Gard Plus" haze meter substantially in accordance with ASTM D1003. Desired haze value for a single sheet of film was 3% or less. A single sheet of film or a laminate that is transparent has a haze value of 3% or less.

Gloss of the film was measured using a commercially available gloss meter such as available from BYK Gardner Instruments "Mirror-Tri-Gloss" and measured substantially in accordance with ASTM D2457. Gloss was measured on both sides of the film, at an angle of 60° for the discharge-treated side and an angle of 20° for the non-discharge-treated side. Desired gloss values were 90 gloss units or higher for either side.

Wetting tension of the surfaces of interest was measured substantially in accordance with ASTM D2578-67. In general, the preferred value was equal to or greater than 36 dyne/cm. Wetting tension (WT) was also measured before and after forced-aging ($WT_b$, $WT_a$, respectively) and the amount of wetting tension decrease calculated as a percentage change (i.e. ($WT_b - WT_a$)/$WT_b$). The preferred value for this change was 10% or less.

Forced-aging of the test films was conducted as follows: several 8½"×11" cut-sheet samples of the exemplary films (e.g. about a dozen sheets of one of the respective film variables) were stacked or cut from a slab sample with the discharge-treated surface of the cut-sheet film samples facing in the "up" position. This stack of film samples were then placed between two smooth, flat steel plates (ordinary office printer paper was placed over the top film sheet sample and on top of the bottom steel plate to separate the film samples from direct contact with the steel plates), and this construction was then placed inside a conditioning oven. A 30-lbs weight was placed on top of the uppermost steel plate. The conditioning oven was set for 122° F. (50° C.) for 8 hours. After aging, the stack of film samples was removed and allowed to cool to room temperature. The weight and upper steel plate were removed, and the office paper and the first sheet of the film sample stack were discarded. The remaining film sheet samples were carefully separated and surface energy (wetting tension) and printability were tested upon the discharge-treated film surface. If desired, several sets of test film variables can be force-aged simultaneously by interleaving office paper between each stack of test film variable to keep each variable set separate from its neighboring set of film variables (see FIG. 1).

Printability was rated qualitatively using a ranking system of 1.0-4.0, with 1.0 equating to very poor printability and 4.0 equating to excellent printability. 8½"×11" cut-sheet samples of the films were coated via hand drawdowns using a #4 Meyer rod on the side of interest with ca. ½ teaspoon ink (CC-ST 62 white ink from Toyo Ink), dried at 60° C. for 60 seconds in an oven, and tested for ink adhesion using a tape test. A strip of 24 mm wide adhesive cellophane tape is adhered to the non-inked side; a strip of 12 mm wide adhesive cellophane tape (e.g. 3M 610 tape) is adhered to the inked side corresponding to the area covered by the 24 mm tape on the un-inked side, and peeled off quickly, keeping the hand parallel to the film sample. The amount of ink remaining on the peeled surface of the film sample is then rated as follows:

1.0=75% removal of ink
2.0=50% removal of ink
3.0=25% removal of ink
4.0=0-10% removal of ink In general, preferred value for printability is 3.0 minimum.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

We claim:

1. A laminate film comprising a core layer, the core layer comprising: a crystalline propylene homopolymer of at least 90% isotactic index; and a fluoropolymer in an amount of 0.01-0.1% by weight of the core layer; wherein the laminate film is transparent and has a moisture vapor transmission rate of 0.185 g/100 in$^2$/day or less.

2. A laminate film comprising a core layer, the core layer comprising: a crystalline propylene homopolymer of at least 90% isotactic index; and a metal oxide nanoparticle in an amount of 0.01-0.5% by weight of the core layer; wherein the laminate film is transparent and has a moisture vapor transmission rate of 0.185 g/100 in$^2$/day or less.

3. The laminate film of claim 1, wherein the core layer further comprises a hydrocarbon resin in an amount of 1-15% by weight of the core layer.

4. The laminate film of claim 2, wherein the core layer further comprises a hydrocarbon resin in an amount of 1-15% by weight of the core layer.

5. The laminate film of claim 1, wherein the core layer further comprises a crystalline polyethylene wax in an amount of 0.1-5% by weight of the core layer.

6. The laminate film of claim 2, wherein the core layer further comprises a crystalline polyethylene wax in an amount of 0.1-5% by weight of the core layer.

7. The laminate film of claim 1, wherein the laminate film has a haze of 3% or less, a wetting tension after force-aging of at least 36 dyne/cm.

8. The laminate film of claim 2, wherein the laminate film has a haze of 3% or less, a wetting tension after force-aging of at least 36 dyne/cm.

9. The laminate film of claim 1, wherein the crystalline propylene homopolymer has at least 95% isotactic index.

10. The laminate film of claim 2, wherein the crystalline propylene homopolymer has at least 95% isotactic index.

11. The laminate film of claim 1, wherein the laminate film has a moisture vapor transmission rate of 0.17 g/100 in$^2$/day or less.

12. The laminate film of claim 2, wherein the laminate film has a moisture vapor transmission rate of 0.17 g/100 in$^2$/day or less.

13. The laminate film of claim 1, further comprising a first skin layer disposed on one side of the core layer, wherein the first skin layer comprises an isotactic polypropylene, mini-random ethylene-propylene copolymer, a high density ethylene homopolymer, a mixed resin layer blend of isotactic propylene homopolymer and an ethylene-propylene copolymer, or combinations thereof.

14. The laminate film of claim 2, further comprising a first skin layer disposed on one side of the core layer, wherein the first skin layer comprises an isotactic polypropylene, mini-random ethylene-propylene copolymer, a high density ethylene homopolymer, a mixed resin layer blend of isotactic propylene homopolymer and an ethylene-propylene copolymer, or combinations thereof.

15. A laminate film comprising a core layer, the core layer comprising: a crystalline propylene homopolymer of at least 90% isotactic index; a hydrocarbon resin in an amount of 1-15% by weight of the core layer; a crystalline polyethylene wax in an amount of 0.1-5% by weight of the core layer; and a fluoropolymer in an amount of 0.01-0.1% by weight of the core layer and/or a metal oxide nanoparticle in an amount of 0.01-0.5% by weight of the core layer wherein the laminate film has a moisture vapor transmission rate of 0.185 g/100 in$^2$/day or less.

16. The laminate film of claim 15, wherein the core layer comprises the fluoropolymer in an amount of 0.01-0.1% by weight of the core layer and the metal oxide nanoparticle in an amount of 0.01-0.5% by weight of the core layer.

17. The laminate film of claim 15, wherein the laminate film has a haze of 3% or less, a wetting tension after force-aging of at least 36 dyne/cm.

18. The laminate film of claim 15, wherein the crystalline propylene homopolymer has at least 95% isotactic index.

19. The laminate film of claim 15, wherein the laminate film has a moisture vapor transmission rate of 0.17 g/100 in$^2$/day or less.

20. The laminate film of claim 15, further comprising a first skin layer disposed on one side of the core layer, wherein the first skin layer comprises an isotactic polypropylene, mini-random ethylene-propylene copolymer, a high density ethylene homopolymer, a mixed resin layer blend of isotactic propylene homopolymer and an ethylene-propylene copolymer, or combinations thereof.

21. The laminate film of claim 15, wherein the laminate film is transparent.

* * * * *